(12) United States Patent
Karunanithi et al.

(10) Patent No.: US 10,929,384 B2
(45) Date of Patent: Feb. 23, 2021

(54) SYSTEMS AND METHODS FOR DISTRIBUTED DATA VALIDATION

(71) Applicant: Walmart Apollo, LLC, Bentonville, AR (US)

(72) Inventors: Karthikeyan Karunanithi, Madurai (IN); Venkat Ramana Rao Rapolu, Bentonville, AR (US); Sandeep George Moolayil, Pala (IN); Azad Krishna Tripathi, Jaipur (IN); Suraj Kumar Baghel, Durg (IN); Surya Janjam, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 225 days.

(21) Appl. No.: 15/998,711

(22) Filed: Aug. 16, 2018

(65) Prior Publication Data

US 2019/0155801 A1     May 23, 2019

Related U.S. Application Data

(60) Provisional application No. 62/546,121, filed on Aug. 16, 2017.

(51) Int. Cl.
   *G06F 16/00*             (2019.01)
   *G06F 16/23*             (2019.01)
   (Continued)

(52) U.S. Cl.
   CPC ............ *G06F 16/2365* (2019.01); *G06F 7/00* (2013.01); *G06F 11/30* (2013.01); *G06F 16/182* (2019.01);
   (Continued)

(58) Field of Classification Search
   CPC .. G06F 16/182; G06F 16/2365; G06F 16/248; G06F 16/27; G06F 16/2282;
   (Continued)

(56) References Cited

U.S. PATENT DOCUMENTS 4,984,155 A     1/1991    Geier et al.
5,497,486 A     3/1996    Stolfo et al.
(Continued)

FOREIGN PATENT DOCUMENTS

CN           103699693 A     4/2014
WO    WO 1993/004449 A1     3/1993
(Continued)

OTHER PUBLICATIONS

U.S. Appl. No. 15/724,333, filed Oct. 4, 2017, Inventor(s): Ledbetter et al.
(Continued)

*Primary Examiner* — Anh Ly
(74) *Attorney, Agent, or Firm* — Patterson Thuente Pedersen, P.A.

(57) ABSTRACT

Embodiments of the present disclosure include systems and methods for validating a target data table based on a source data table. A distributed memory comprises a plurality of computing systems, each storing at least a portion of the source data table and the target data table in local memory. Processing engines can be efficiently executed on each of the plurality of computing systems to perform comparison functions based on in-memory data. A checksum comparison engine is configured to compare source and target checksums. A data aggregation engine is configured to produce column-based aggregation summaries. A rule generation engine is configured to generate validation rules for checking by a validation engine.

19 Claims, 11 Drawing Sheets

(51) Int. Cl.
*G06F 21/64* (2013.01)
*G06F 16/215* (2019.01)
*G06F 16/182* (2019.01)
*G06F 16/2458* (2019.01)
*G06F 16/34* (2019.01)
*G06F 16/242* (2019.01)
*G06F 16/248* (2019.01)
*G06F 11/30* (2006.01)
*G06F 16/27* (2019.01)
*G06F 7/00* (2006.01)
*G06F 16/22* (2019.01)

(52) U.S. Cl.
CPC ........ *G06F 16/215* (2019.01); *G06F 16/2282* (2019.01); *G06F 16/244* (2019.01); *G06F 16/248* (2019.01); *G06F 16/2462* (2019.01); *G06F 16/27* (2019.01); *G06F 16/345* (2019.01); *G06F 21/64* (2013.01)

(58) Field of Classification Search
CPC .. G06F 16/215; G06F 16/2462; G06F 16/345; G06F 16/244; G06F 11/30; G06F 11/2094; G06F 11/2056; G06F 11/1004; G06F 11/1076; G06F 11/2064; G06F 21/00; G06F 2201/80; G06F 21/64; G06F 7/00; G06F 16/2308; G06F 16/258; G06F 16/2255; G06F 16/00; H03K 19/00
See application file for complete search history.

(56) References Cited

U.S. PATENT DOCUMENTS

| | | | |
|---|---|---|---|
| 5,684,990 A | 11/1997 | Boothby | |
| 5,819,291 A | 10/1998 | Haimowitz et al. | |
| 6,336,117 B1 | 1/2002 | Massarani | |
| 6,490,590 B1 | 12/2002 | Fink | |
| 6,523,027 B1 | 2/2003 | Underwood | |
| 6,865,577 B1 | 3/2005 | Sereda | |
| 6,959,286 B2 | 10/2005 | Perkowski | |
| 6,988,093 B2 | 1/2006 | Pic et al. | |
| 7,152,060 B2 | 12/2006 | Borthwick et al. | |
| 7,328,428 B2 | 2/2008 | Baugher | |
| 7,379,996 B2 | 5/2008 | Papatla et al. | |
| 7,519,635 B1 | 4/2009 | Haustein et al. | |
| 7,549,052 B2 | 6/2009 | Haitsma et al. | |
| 7,730,028 B2 | 6/2010 | Tysowski et al. | |
| 7,809,763 B2 * | 10/2010 | Nori ...................... G06F 16/213 707/802 | |
| 7,886,124 B2 | 2/2011 | Muthulingham et al. | |
| 7,899,796 B1 | 3/2011 | Borthwick et al. | |
| 7,917,617 B1 | 3/2011 | Ponnapur et al. | |
| 7,921,086 B1 | 4/2011 | Bromley et al. | |
| 7,953,744 B2 | 5/2011 | Gharat et al. | |
| 8,015,163 B2 | 9/2011 | Welingkar et al. | |
| 8,127,109 B2 | 2/2012 | Matze | |
| 8,176,475 B2 * | 5/2012 | Kosche ............... G06F 11/3447 717/127 | |
| 8,204,867 B2 | 6/2012 | Benhase et al. | |
| 8,234,468 B1 | 7/2012 | Deshmukh et al. | |
| 8,245,183 B2 | 8/2012 | Iborra et al. | |
| 8,275,770 B2 | 9/2012 | Bayliss | |
| 8,301,610 B2 | 10/2012 | Driesen et al. | |
| 8,312,028 B2 | 11/2012 | Canora et al. | |
| 8,359,337 B2 | 1/2013 | Anumakonda et al. | |
| 8,364,652 B2 | 1/2013 | Vijayan et al. | |
| 8,386,529 B2 | 2/2013 | Chaudhuri et al. | |
| 8,442,949 B1 | 5/2013 | Gunda et al. | |
| 8,522,206 B2 | 8/2013 | Chan et al. | |
| 8,577,927 B2 | 11/2013 | Fabret et al. | |
| 8,645,399 B2 | 2/2014 | McNeill et al. | |
| 8,909,599 B2 | 12/2014 | Khaladkar et al. | |
| 9,053,112 B2 | 6/2015 | Rathod et al. | |
| 9,098,364 B2 | 8/2015 | Davis | |
| 9,152,627 B2 | 10/2015 | Kung et al. | |
| 9,258,262 B2 | 2/2016 | Watt et al. | |
| 9,367,586 B2 | 6/2016 | Hans et al. | |
| 9,367,597 B2 | 6/2016 | Behuria et al. | |
| 9,424,290 B2 | 8/2016 | Jha | |
| 9,509,500 B2 | 11/2016 | Qian | |
| 9,830,377 B1 | 11/2017 | Ray et al. | |
| 10,007,689 B1 | 6/2018 | Ray et al. | |
| 2002/0026339 A1 | 2/2002 | Frankland et al. | |
| 2002/0147725 A1* | 10/2002 | Janssen ................ G06F 16/221 | |
| 2002/0169934 A1 | 11/2002 | Krapp et al. | |
| 2003/0093333 A1 | 5/2003 | Veeneman | |
| 2003/0097359 A1 | 5/2003 | Ruediger | |
| 2004/0093323 A1 | 5/2004 | Bluhm et al. | |
| 2004/0139001 A1 | 7/2004 | Henriques et al. | |
| 2004/0172393 A1 | 9/2004 | Kazi et al. | |
| 2005/0149582 A1 | 7/2005 | Wissmann et al. | |
| 2005/0197807 A1 | 9/2005 | Nelson et al. | |
| 2005/0256798 A1 | 11/2005 | Herter et al. | |
| 2006/0059253 A1 | 3/2006 | Goodman et al. | |
| 2006/0095447 A1* | 5/2006 | Dickinson ............... G06F 16/20 | |
| 2006/0111135 A1 | 5/2006 | Gray et al. | |
| 2006/0248048 A1 | 11/2006 | Jain et al. | |
| 2008/0005141 A1 | 1/2008 | Zheng et al. | |
| 2008/0098083 A1 | 4/2008 | Shergill et al. | |
| 2008/0120271 A1 | 5/2008 | Hunt et al. | |
| 2008/0161940 A1* | 7/2008 | Gerwens ................ G06Q 10/06 700/4 | |
| 2008/0168081 A1 | 7/2008 | Gaurav et al. | |
| 2009/0271359 A1 | 10/2009 | Bayliss | |
| 2010/0024012 A1 | 1/2010 | Devine et al. | |
| 2010/0281061 A1 | 11/2010 | Chen | |
| 2011/0185136 A1 | 7/2011 | Gavrilov et al. | |
| 2012/0084268 A1 | 4/2012 | Vijayan et al. | |
| 2013/0117232 A1 | 5/2013 | Lee et al. | |
| 2013/0124361 A1 | 5/2013 | Bryson | |
| 2013/0173402 A1 | 7/2013 | Young | |
| 2013/0173560 A1 | 7/2013 | McNeill et al. | |
| 2013/0212103 A1 | 8/2013 | Cao et al. | |
| 2014/0040203 A1 | 2/2014 | Lu et al. | |
| 2014/0310231 A1* | 10/2014 | Sampathkumaran ........................ G06F 16/254 707/602 | |
| 2015/0019195 A1 | 1/2015 | Davis | |
| 2015/0039600 A1 | 2/2015 | Walters et al. | |
| 2015/0073967 A1* | 3/2015 | Katsuyama ............. H04L 47/12 705/37 | |
| 2016/0275150 A1* | 9/2016 | Bournonnais ..... G06F 16/24575 | |
| 2017/0206256 A1 | 7/2017 | Tsirogiannis et al. | |
| 2018/0032593 A1 | 2/2018 | Ledbetter et al. | |
| 2018/0096043 A1 | 4/2018 | Ledbetter et al. | |
| 2018/0137139 A1* | 5/2018 | Bangalore ............. G06F 16/172 | |
| 2018/0308145 A1* | 10/2018 | Tucker ............... G06Q 30/0625 | |
| 2019/0130220 A1* | 5/2019 | Zou ...................... G06K 9/6274 | |

FOREIGN PATENT DOCUMENTS

| | | |
|---|---|---|
| WO | WO 2007/081925 A1 | 7/2007 |
| WO | WO 2015/065260 A1 | 5/2015 |
| WO | WO 2018/053117 A1 | 3/2018 |

OTHER PUBLICATIONS

Application and Filing Receipt for U.S. Appl. No. 14/213,951, filed Mar. 14, 2014, Inventor(s): Ray et al.
Application and Filing Receipt for U.S. Appl. No. 14/214,204, filed Mar. 14, 2014, Inventor(s): Ray et al.
Application and Filing Receipt for U.S. Appl. No. 15/956,106, filed Apr. 18, 2018, Inventor(s): Tucker et al.
Application and Filing Receipt for U.S. Appl. No. 15/659,833, filed Jul. 26, 2017, Inventor(s): Ledbetter et al.
Application and Filing Receipt for U.S. Appl. No. 15/938,825, filed Mar. 28, 2018, Inventor(s): Austin et al.
Dataedo; Datado—Document your databases—Data Dictionary & ERD; https://dataedo.com/ [retrieved Nov. 26, 2018]; 8 pages.

(56) References Cited

OTHER PUBLICATIONS

Database Documentation Generator for SQL Server | SQL Doc; https://www.red-gate.com/products/sql-development/sql-doc/; [retrieved Nov. 26, 2018]; 6 pages.
Application and Filing Receipt for U.S. Appl. No. 14/214,053, filed Mar. 14, 2014, Inventor(s): Ray et al.
Application and Filing Receipt for U.S. Appl. No. 14/214,401, filed Mar. 14, 2014, Inventor(s): Parekh et al.
International Search Report and Written Opinion for corresponding International Application No. PCT/US2017/043872 dated Oct. 20, 2017; 12 pages.
"Transferring Data Between Plesk Servers"; http://docs.plesk.com/en-US/12.5/migration-guide/introduction_75496/?fileName=71244.htm 2 pages, retrieved May 24, 2016.
"Advanced Upgrade and Database Migration"; https://sc1.checkpoint.com/documents/R76/CP_R76_Installation_and_Upgrade_Guide-webAdmin/16535.htm 12 pages, retrieved May 24, 2016.
International Search Report and Written Opinion for corresponding PCT Application No. PCT/US2018/000171 dated Nov. 21, 2018; 8 pages.
U.S. Appl. No. 16/177,712, filed Nov. 1, 2018, Inventor(s): Helms et al.
International Search Report and Written Opinion for PCT Application No. PCT/US2018/058640 dated Jan. 16, 2019; 9 pages.

\* cited by examiner

Add Table Form

Database Type: Cassandra
Database Name:
Driver Class:
Connection String:
User Name:
Password:
Table Name:
HDFS Directory:

Partition Column:
Lower Bound:
Upper Bound:
☑ Key Available
Key:
☑ Full Load
Where Condition:
Extract Query:

Add | Reset | Save in File 220
222a
202a

FIG. 3B

Load Data to HDFS

| Home | Dashboard | Data Comparison | Data Load | Help | Contact |

Database Type: Cassandra

Database Name: [ ]

Driver Class: [ ]

Connection String: [ ]

User Name: [ ]

Password: [ ]

Table Name: [ ]

HDFS Directory: [ ]

Partition Column: [ ]

Lower Bound: [ ]

Upper Bound: [ ]

☑ Full Load

Where Condition: [ ]

Extract Query: [ ]

[Reset]   [Submit]

Source Data 102

| ITEM_NUM | ITEM_DESC | INV | WKLY_QTY | UNIT_PRICE | WKLY_AMT |
|---|---|---|---|---|---|
| 1001 | Ball, Red | 15 | 5 | $10.00 | $50.00 |
| 1002 | Hat | 75 | 43 | $14.00 | $602.00 |
| 1003 | Microphone | 18 | 5 | $39.95 | $199.75 |
| 1004 | Planter, clay | 18 | 2 | $11.49 | $22.98 |
| 1005 | Watch, Digital | 63 | 19 | $259.99 | $4,939.81 |
| 1006 | Mirror | 42 | 55 | $20.00 | $1,100.00 |

Target Data 106

| ITEM_NBR | ITEM_DESC | INV | WKLY_QTY | UNIT_PRICE | WKLY_AMT |
|---|---|---|---|---|---|
| 1001 | Ball, Red | 15 | 7 | $10.00 | $50.00 |
| 1002 | Hat, Purple | 75 | 43 | $14.00 | $602.00 |
| 1003 | Micrphone | 18 | 5 | $39.95 | $199.75 |
| 1004 | Planter, | 18 | 2 | $11.49 | $22.98 |
| 1005 | Watch, Digital | 36 | 19 | $259.99 | $4,939.81 |
| 1006 | Mirror | 42 | 55 | $25.00 | $1,100.00 |

FIG. 5A

REPORT 204

Aggregation Summary: 502

Checksums Matched?: NO 402'

Source

| Summary | INV | WKLY_QTY | UNIT_PRICE | WKLY_AMT |
|---|---|---|---|---|
| Minimum | 15 | 2 | 10 | 22.98 |
| Maximum | 75 | 55 | 259.99 | 4939.81 |
| Mean | 38.50 | 21.50 | 59.24 | 1152.42 |
| Count | 6 | 6 | 6 | 6 |

Target

| Summary | INV | WKLY_QTY | UNIT_PRICE | WKLY_AMT |
|---|---|---|---|---|
| Minimum | 15 | 2 | 10 | 22.98 |
| Maximum | 75 | 55 | 259.99 | 4939.81 |
| Mean | 34.00 | 21.83 | 60.07 | 1152.42 |
| Count | 6 | 6 | 6 | 6 |

Validation Report: 702  602
ITEM_DESC Possible Values: Ball, Red; Hat; Microphone; Planter, clay; Watch, Digital; Mirror

| ITEM_NBR | ITEM_DESC | INV | WKLY_QTY | UNIT_PRICE | WKLY_AMT |
|---|---|---|---|---|---|
| 1002 | Hat, Purple | 75 | 43 | $14.00 | $602.00 |
| 1003 | Micrphone | 22 | 4 | $39.95 | $159.80 |
| 1004 | Planter, | 18 | 2 | $11.49 | $22.98 |

Metadata Report: 802

| Source Name | ITEM_NUM | ITEM_DESC | INV | WKLY_QTY | UNIT_PRICE | WKLY_AMT |
|---|---|---|---|---|---|---|
| Source Type | INT, unique | Text | INT | INT | NUMBER | NUMBER |
| Target Name | ITEM_NBR | ITEM_DESC | INV | WKLY_QTY | UNIT_PRICE | WKLY_AMT |
| Target Type | INT, unique | Text | INT | INT | NUMBER | NUMBER |

FIG. 5B

SYSTEMS AND METHODS FOR DISTRIBUTED DATA VALIDATION

RELATED APPLICATION

The present application claims the benefit of U.S. Provisional Application No. 62/546,121 filed Aug. 16, 2017, which is hereby incorporated herein in its entirety by reference.

TECHNICAL FIELD

Embodiments of the present disclosure relate generally to the field of data replication, in particular the validation of replicated data across large and remote data sets.

BACKGROUND

Many database systems must support the analysis of large data sets in order to meet business, research, or other needs. These large data sets are often colloquially known as "big data." Many database systems, tools, and techniques have been developed to better handle big data.

As used through this disclosure, a database is a structured set of data held in a computer. Database software provides functionalities that allow building, modifying, accessing, and updating both databases and the underlying data. Databases and database software reside on database servers. Database servers are collections of hardware and software that provide storage and access to the database and enable execution of the database software.

A common task for database administrators is the movement, or migration, of data from one database to another. Large (multi-terabyte) tables are common in big data environments, which can pose a particular challenge for data migration, especially when outages resulting in lack of access to either the source or the target database are unacceptable. These challenges are exacerbated when large data sets must be replicated between database systems, especially in multi-tenant data warehouse systems.

Conventional techniques for validating the success or accuracy of data replication activities rely on assumptions that are often not valid for large data sets. One technique includes automated row-by-row matching and comparing of records across source and target databases. In distributed environments, it is often the case that no individual computing system can store or access the entirety of a data set, leading to partitioning of data sets across database systems. This can make row-by-row matching of data sets difficult to perform efficiently, especially when records are not guaranteed to be stored or indexed in any particular order.

Data warehouse environments often also include heterogeneous database systems and schemas storing copies of the same data, in order to meet particular application needs. Often, record identifiers or other unique data elements are independently generated by individual database systems, which can inhibit row-by-row matching, and/or result in a number of false-positives.

Automated tools often also rely on knowledge of the underlying metadata for the data in each of the columns of a given database system. For a variety of application-specific performance reasons this metadata may be stripped, or not provided at all. For example, where data sets are stored in files in a distributed file system, such as the Hadoop distributed file system (HDFS), metadata information may not be present on any given data node, or in the distributed cluster at all.

What are needed in the industry, therefore, are methods and systems for efficient validation of large data sets in heterogeneous database systems with a limited knowledge of the metadata.

SUMMARY

Embodiments of the present disclosure provide systems and methods for efficiently validating a target data store based on a source data store by systemically performing validation activities to minimize unnecessary processing steps.

In embodiments, a target data table is compared to a source data table by loading the source data table and the target data table into a distributed memory comprising a plurality of computing systems. A systematic validation of the source table can include a number of processing tasks, including computing a checksum result indicating whether one or more source checksums computed based on the source data table match one or more target checksums based on the target data table. If the checksum result indicates that the source checksums do not match the target checksums, further processing can occur. In embodiments, an aggregation summary can be computed for one or more numeric columns of the source data store and one or more numeric columns of the target data store.

In embodiments, a checksum mismatch can be followed by a rules-based, row-by-row comparison to produce a validation resport. Validation rules can be computed based on the source data table, and each row of the target data table can be evaluated based on the rules. The validation rules can include a possible-value rule and a uniqueness rule. Possible-value rules can be generated based on the values in the source table, such that a row will fail validation if it contains a value not in the list of possible values. Uniqueness rules can be enforced if the data in the source table contains unique values. Rows in the target table will fail validation if their values are not unique.

In embodiments, a system for validating a target data table of a target data store based on a source data table of a source data store remote from the target data store comprises a distributed memory comprising a plurality of computing systems. Each computing system can be in data communication with at least one of the source data store or the target data store to receive at least a portion of the source data table and the target data table. Each computing system can be configured to store the portion in a local random access memory such that the distributed memory includes the entirety of the source data table and the target data table. The system includes a user interface configured to generate an output based on a checksum result, an aggregation summary, and/or a row-by-row comparison.

In embodiments, a checksum comparison engine is in data communication with the distributed memory and is configured to respond to a checksum request by computing a checksum result (which can be an MD5 checksum) indicating whether one or more source checksums computed based on the source data table match one or more target checksums based on the target data table.

In embodiments, a data aggregation engine is in data communication with the distributed memory and is configured to respond to a data aggregation request by computing an aggregation summary for one or more numeric columns of the source data store and one or more numeric columns of the target data store.

In embodiments, a rule generation engine is in data communication with the distributed memory and is configured to respond to a rule generation request by computing one or more validation rules based on the source data table. A validation engine is in data communication with the distributed memory and configured to respond to a validation request by evaluating each row of the target data table based on the one or more validation rules to produce a validation report.

In embodiments, at least one of the checksum comparison engine, the data aggregation engine, or the validation engine comprises a parallel instruction set. The parallel instruction set can be executable on each of the computing systems of the distributed memory, such that each of the plurality of computing systems executes the parallel instruction set on the portion of the source data table and the target data table stored in the local random access memory of the computing system, and the parallel instruction set is executed in-memory.

In embodiments, a scheduler is configured to deliver a checksum comparison request to the checksum comparison engine and provide the checksum comparison result to the user interface, deliver a data aggregation request to the data aggregation engine and a rule generation request to the rule generation engine and provide the data aggregation summary to the user interface if the checksum comparison result indicates that the one or more source checksums does not match the one or more target checksums, deliver a data validation request to the validation engine including the generated validation rules to the validation engine, and provide the data validation result to the user interface.

In embodiments, the data aggregation engine is configured to determine whether a column of the source data table is numeric based on the data elements of the source data table and whether a column of the target data table is numeric based on the data elements of the target data table. The data aggregation engine can also compute an aggregation summary for each numeric column of the source data table and the target data table. The aggregation summary can include a mean value, a sum, a minimum value, a maximum value, and a standard deviation value for the data elements in the numeric column.

In embodiments, the rule generation engine is configured to compute a possible value validation rule for a column of the source data table if the column contains a limited set of values, such that the validation engine will determine that a data element of the target data table violates the possible value validation rule if the data element is in the column and has a value that is not represented in the limited set of values.

In embodiments, the rule generation engine is configured to compute a uniqueness rule for a column of the source data table if the column contains unique values for each row of the source table, whereby the validation engine will determine that a column of the target data table violates the uniqueness rule if the column does not contain unique values.

In embodiments, a metadata evaluation engine is configured to respond to a metadata evaluation request by computing a column type for each column of the source data table and the target data table.

A method for validating a target data table of a target data store based on a source data table of a source data store remote from the target data store, each of the target data table and the source data table including one or more rows and one or more columns for storing data elements, can comprise loading the source data table and the target data table into a distributed memory comprising a plurality of computing systems, each computing system in data communication with at least one of the source data store or the target data store to receive at least a portion of the source data table and the target data table and configured to store the portion in a local random access memory such that the distributed memory includes the entirety of the source data table and the target data table. A checksum result can be computed, indicating whether one or more source checksums computed based on the source data table match one or more target checksums based on the target data table. A data aggregation summary can be computed for one or more columns of the source data store and one or more columns of the target data store if the checksum result indicates that the source checksums do not match the target checksums.

If the checksum result indicates that the source checksums do not match the target checksums a validation report can be computed by computing one or more validation rules based on the source data table, and evaluating each row of the target data table based on the one or more validation rules and generating an output based on the checksum result, the aggregation summary, and the validation report.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

FIG. 3B is a screenshot depicting a user interface screen, according to an embodiment.

FIG. 3E is a screenshot depicting a user interface screen, according to an embodiment.

FIG. 5A depicts example source and target data tables, according to an embodiment.

FIG. 5B depicts an example output report, according to an embodiment.

Figure 1:
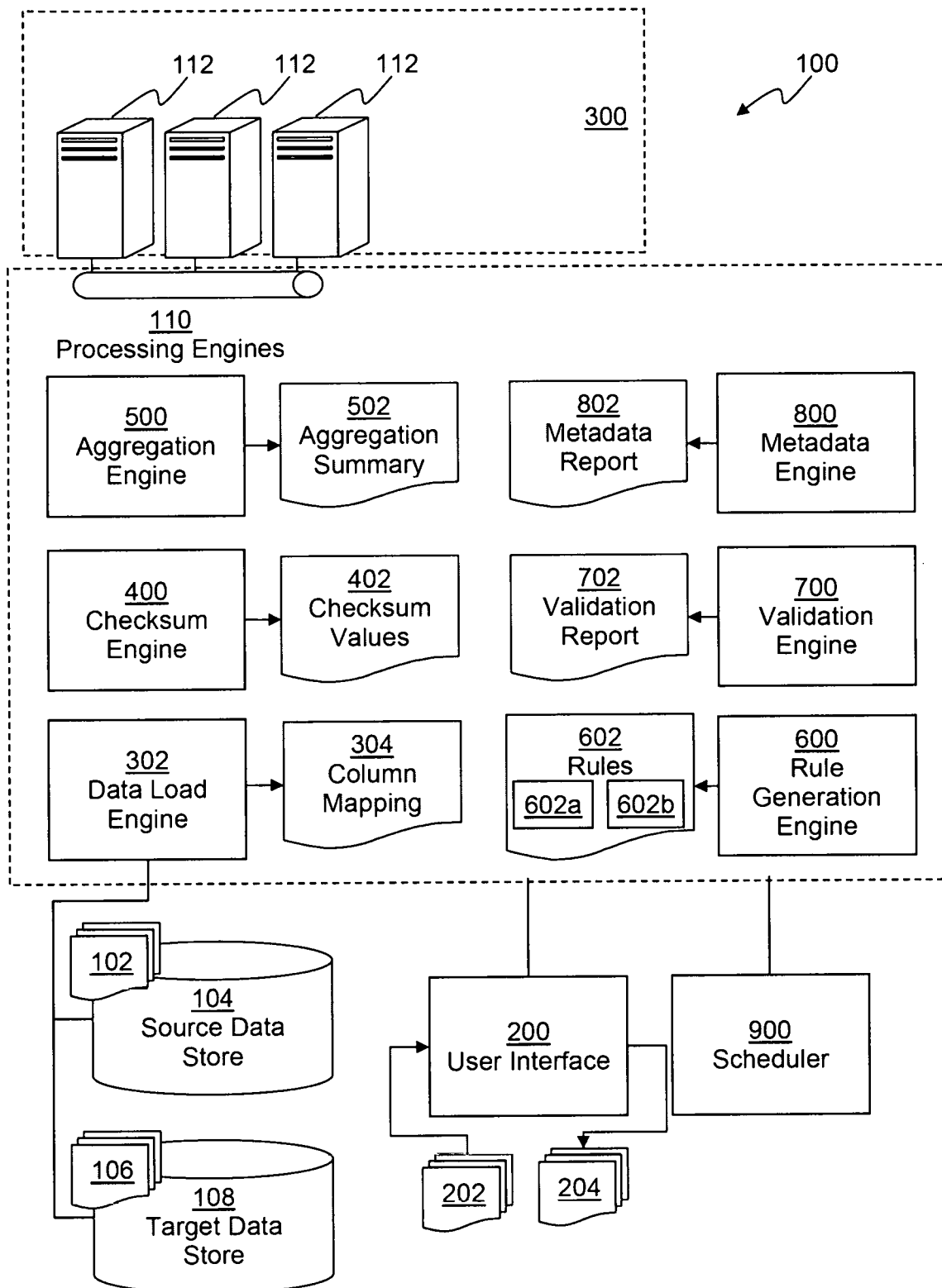
FIG. 1 is a block diagram depicting components and engines of a data validation system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

FIG. 1 is a schematic diagram depicting components and engines of a data validation system 100 according to embodiments of the present disclosure. The various components of system 100 are configured to enable comparison of source data 102, residing in a source data store 104, to target data 106, residing in a target data store 108.

Each of source data store 104 and target data store 108 can be relational databases with tabular structure, or NoSQL or other non-relational databases with key-value, grid, flat files, or other structures. Source data 102 and target data 106 can each comprise one or more data items. Data items can include individual cells or fields, rows, tables, key-value pairs, or entire databases. In embodiments, the stored data items can be divided into groups based on criteria such as the values of subcomponents of each data item.

In an example embodiment, source data 102 and target data 106 can comprise one or more tables, each table having a set of defined columns, and each data item can comprise a single row in a table which can include cells which contain values corresponding to the defined columns. In such an embodiment, the data items could then be grouped based on the value of the cells in a given column.

User interface 200 can comprise input and output devices directly connected to other components of system 100, and/or one or more remote client interfaces, such as web clients, mobile applications, or other interfaces to provide user interaction with system 100. User interface 200 can be a command line, a graphical user interface, or a programmatic interface such as an API or DLL allowing control of system 100 by other software systems and components. In an embodiment, elements of user interface 200 can be dynamically generated using frameworks known in the art such as AngularJS and D3JS.

User interface 200 is configured to receive input parameters 202 and present reports 204 based on validation processing. Input parameters 202 can be received via structured query language (SQL) files, configuration files, command-line inputs, inputs through application programming interface (API) calls, graphical user interface inputs, combinations of these, and/or other inputs as required. Input parameters 202 can include parameters regarding the location of and connection details for source data store 104 and target data store 108. FIGS. 3A-3F depict example screens that can be presented to the user in embodiments, and will be discussed in more detail be low.

System 100 can comprise a number of processing engines 110 in data communication with a distributed memory 300. Processing engines 110 can comprise data load engine 302, checksum engine 400, aggregation engine 500, rule generation engine 600, validation engine 700, and metadata engine 800. Processing engines 110 can reside on and be executed by one or more processing nodes 112, or on any number of other computing systems.

Distributed memory 300 can comprise random access memory (RAM), or other local memory on one or more processing nodes 112. Processing nodes 112 can be arranged in a cluster, such as a Hadoop cluster, or other distributed processing system. In embodiments, processing engines 110 can comprise modules for execution within a parallel processing system. Each processing node 112 can comprise one or more computing systems, or virtual machines. Each processing node 112 can be communicably coupled to one or more other processing nodes of distributed memory 300 via a wired or wireless network connection.

Figure 2:
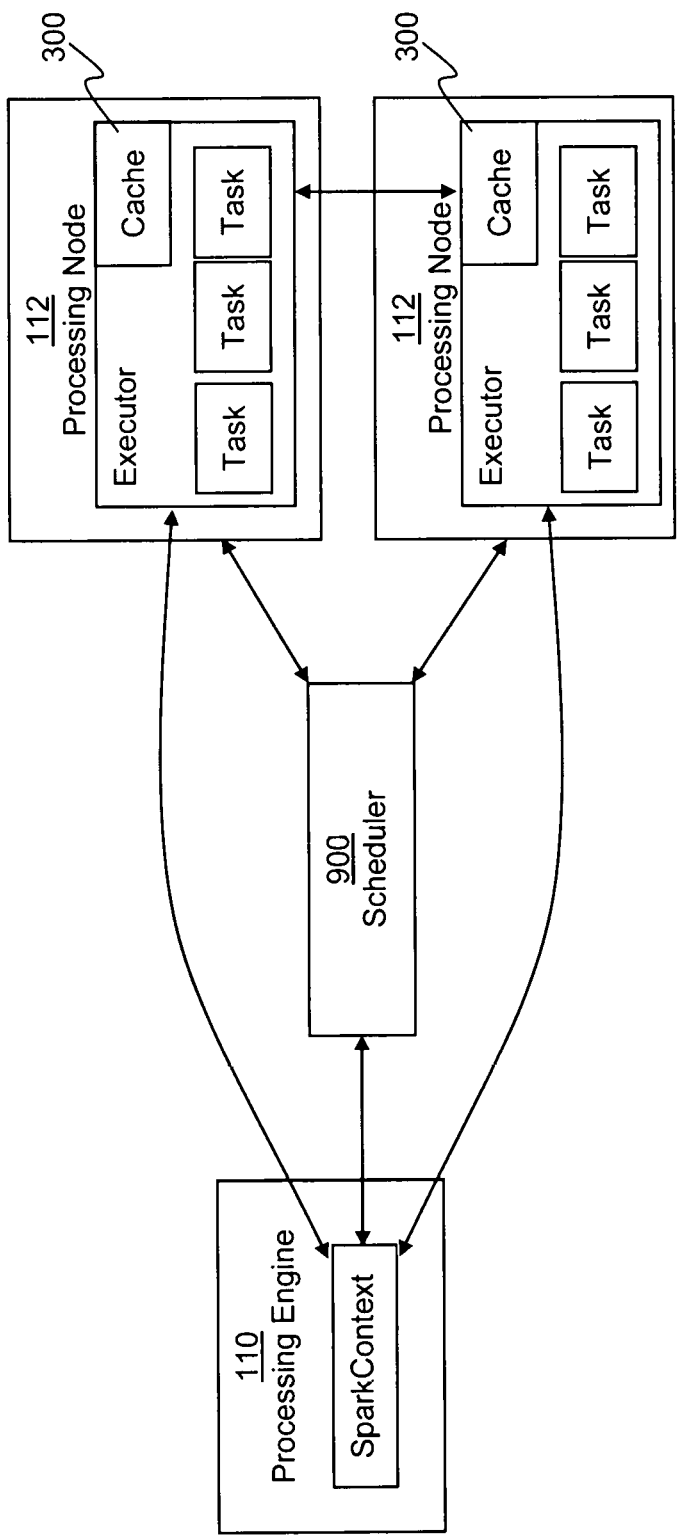
FIG. 2 is a block diagram depicting a distributed processing architecture, according to an embodiment.

FIG. 2 is a block diagram depicting an example embodiment of system 100 within the context of an Apache Hadoop distributed computing system. Processing engines 110 can comprise Apache Spark contexts, or other driver programs for parallel processing. Each processing node 112 can comprise a Hadoop worker node. Scheduler 900 can comprise a computing system hosting a Hadoop cluster manager. Hadoop and other distributed processing systems can provide data awareness between scheduler 900 and each processing node 112. Scheduler 900 can schedule tasks to the worker nodes with an awareness of the data location. For example: if node A contains data (x, y, z) and node B contains data (a, b, c), the scheduler 900 can schedule node B to perform tasks on (a, b, c) and node A can be scheduled to perform tasks on (x, y, z). This can reduce the amount of traffic that goes over the network and limit unnecessary data transfer. Distributed memory 300 can also advantageously comprise the distributed caches of each processing node 112.

In operation, the components and engines of system 100 can be used to provide a report 204 based on comparisons between the contents of source data store 104 and target data store 108.

Figure 3A:
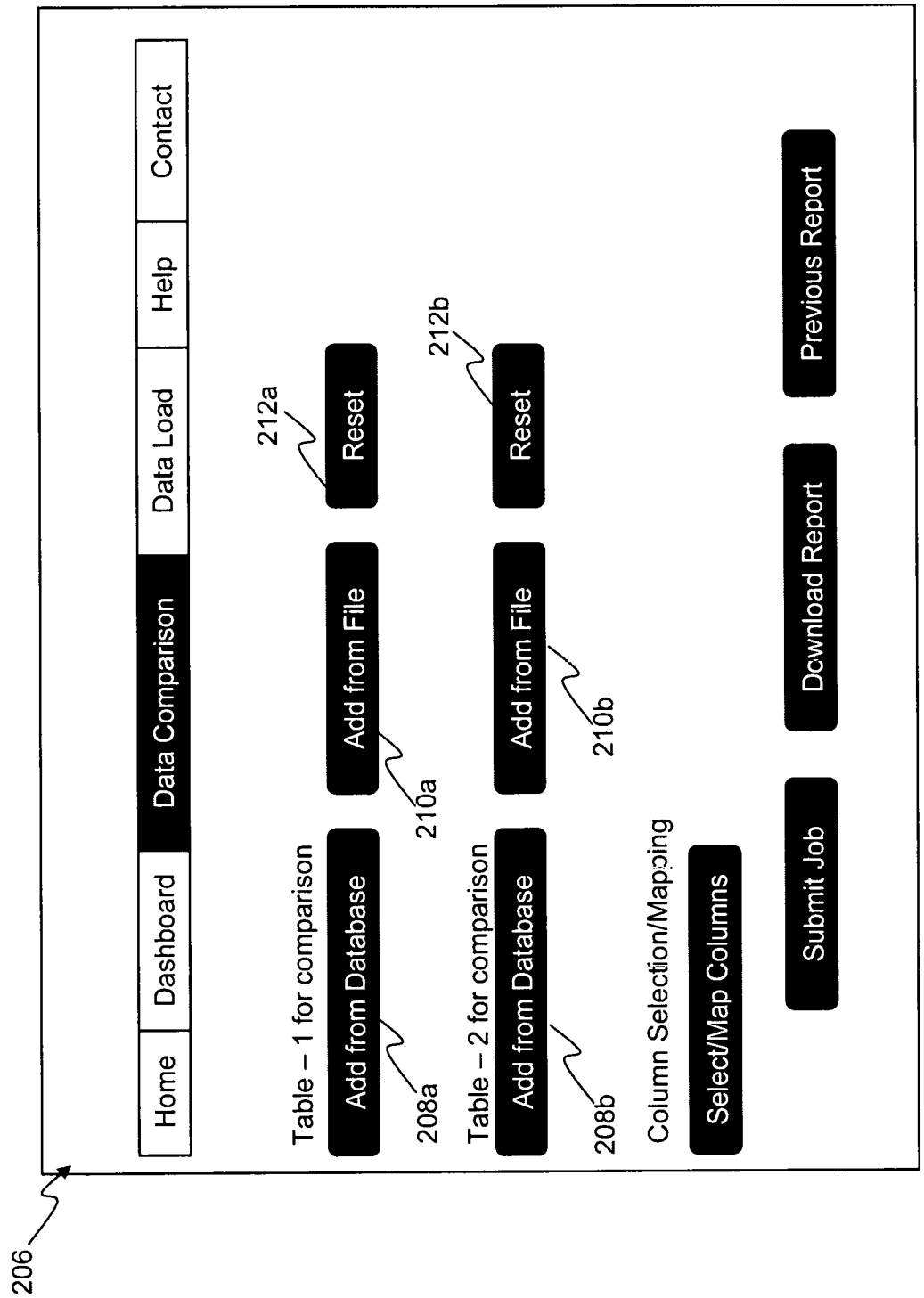
FIG. 3A is a screenshot depicting a user interface screen, according to an embodiment.

FIGS. 3A-3F depict a series of screens that can be presented by embodiments of user interface 200 to receive input parameters 202 from the user. The screens of FIGS. 3A-3F show a browser-based interface, though other user interfaces can be used, as discussed above. FIG. 3A depicts a data comparison screen 206. Interface elements 208a and 208b are user-selectable for configuration of database sources for each of the source data store 104 and the target data store 108, respectively. Interface elements 210a and 210b are user-selectable for configuration of file locations for each of the source data store 104 and the target data store 108, respectively. Interface elements 212a and 212b can enable the user to selectively reset input parameters 202.

Upon user selection of a database configuration element, a database configuration screen 220 can be presented, as depicted in the example of FIG. 3B. Database configuration screen 220 can comprise a variety of fields 222a for entry of database configuration input parameters 202a. In an embodiment, database configuration input parameters can include those listed in Table 1 below:

TABLE 1

Database Configuration Parameters

| Parameter Name | Parameter Description | Example Value(s) |
| --- | --- | --- |
| Database Type | Database type of data store | Teradata<br>Greenplum<br>Oracle<br>Mysql<br>Sap_Hana |
| Database Name | Database name under which table resides | US_SA_DB |
| Full Load | If false, then only a portion of the data will be loaded (incremental) based on the Where Condition parameter | True<br>False |
| Driver Class | JDBC Driver class (this can be automatically populated based upon the database type) | com.teradata.jdbc.TeraDriver |
| Connection String | Connection string which includes hostname and port number | jdbc:teradata://ABC |
| Table Name | Table Name | SchemaName.tableName<br>TableName |
| Where Condition | Filter condition for incremental loads. | cast(MY_DATE as date) >'2016-01-01' |
| Key Available | Are there any primary and/or composite keys? | True<br>False |

TABLE 1-continued

Database Configuration Parameters

| Parameter Name | Parameter Description | Example Value(s) |
| --- | --- | --- |
| Key | If above property is true then enter key values as comma separated | key1, key2 |
| HDFS Directory | Distributed file system directory location | /user/test/ |
| User Name | User name to connect to database | test |
| Password | Password to Connect to database | password |
| Partition Column | Identification of a column that can be used to partition the data across nodes | Column1 |
| Lower Bound | Lowest value available in partition column | 100 |
| Upper Bound | Largest value available in partition column | 10000 |
| Extract Query | SQL statement defining a user-defined data load, can be used if multiple tables or data transformation is involved | select * from X, Y where X.a = Y.a and X.b = Y.b |

Figure 3C:
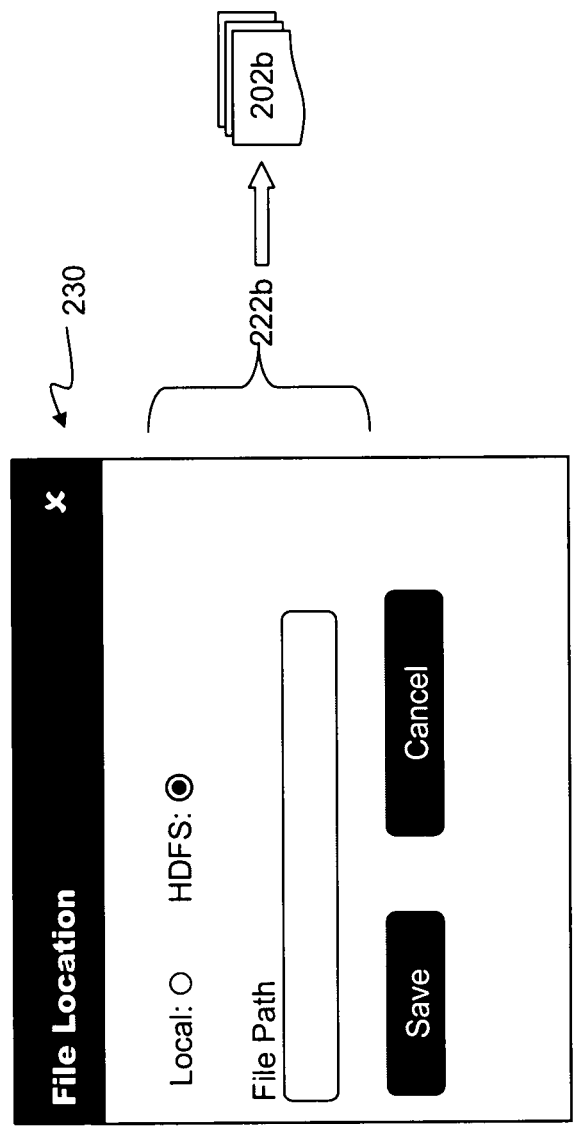
FIG. 3C is a screenshot depicting a user interface screen, according to an embodiment.

Upon user selection of a file location configuration element, a file configuration screen 230 can be presented, as depicted in the example of FIG. 3C. Screen 230 can present a variety of fields 222b for entry of file location input parameters 202b. In an embodiment, file location input parameters 202b can include an indication of whether the file is located in local data storage, or in a distributed file system, such as Hadoop Distributed File System (HDFS). File location input parameters 202b can further include the path to the file.

Figure 3D:
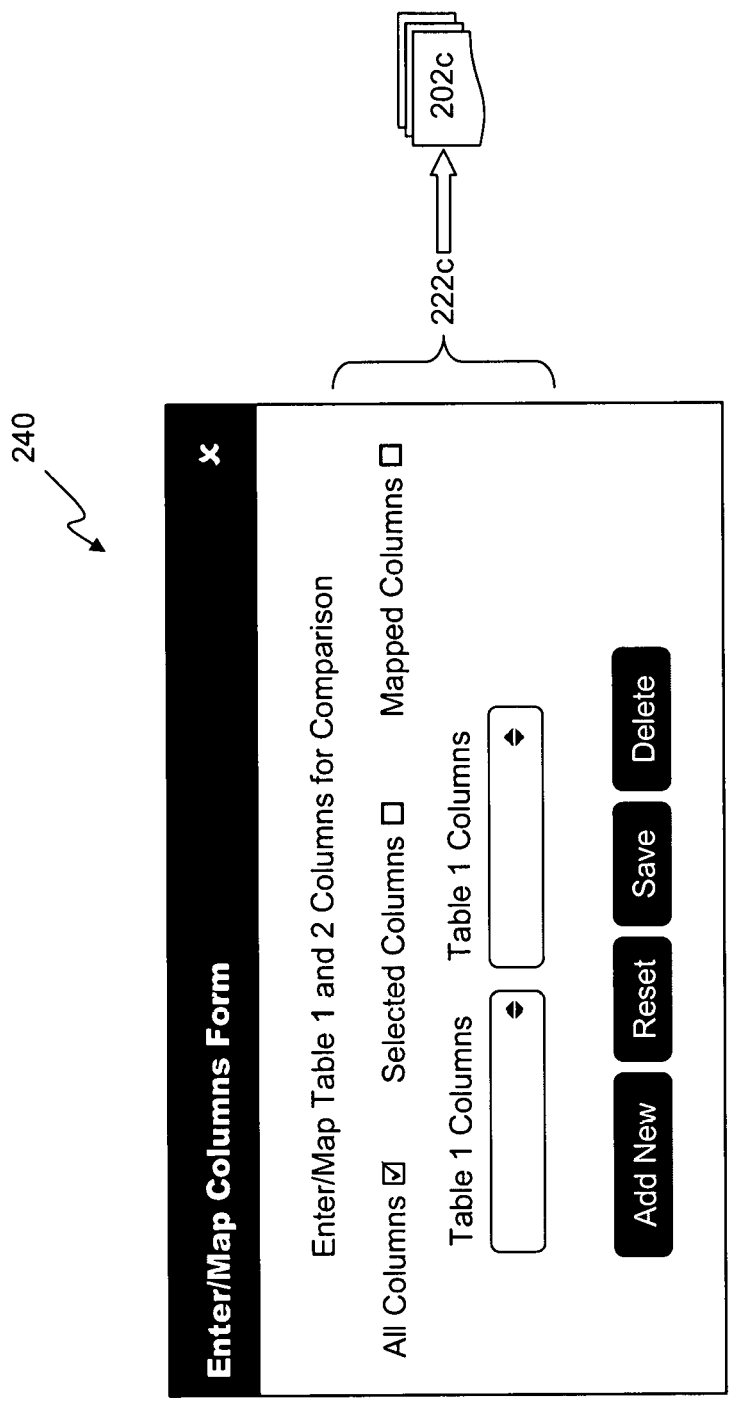
FIG. 3D is a screenshot depicting a user interface screen, according to an embodiment.

After input parameters defining source data store 104 and target data store 108 have been entered, the user can select a column mapping interface element 214 to provide column mappings, in embodiments. A column mapping screen 240 can be presented, as depicted in the example of FIG. 3D. Screen 240 can present a variety of fields 222c for entry of column mapping input parameters 202c. Column mapping input parameters 202c can include one or more pairs of column names from each of source data store 104 and target data store 108. In embodiments, screen 240 can enable the user to specify which columns should be used for the comparison.

In embodiments, distributed memory configuration screen 250 can be presented, as depicted in the example of FIG. 3E. Screen 250 can present a variety of fields 222d for entry of distributed memory configuration parameters 202d. Distributed memory configuration parameters 202d can include configuration information necessary for connection to, or creation of a distributed memory for temporary storage of source and target data. In an embodiment, distributed memory configuration parameters 202d can include parameters necessary for configuration of an HDFS data store.

Figure 3F:
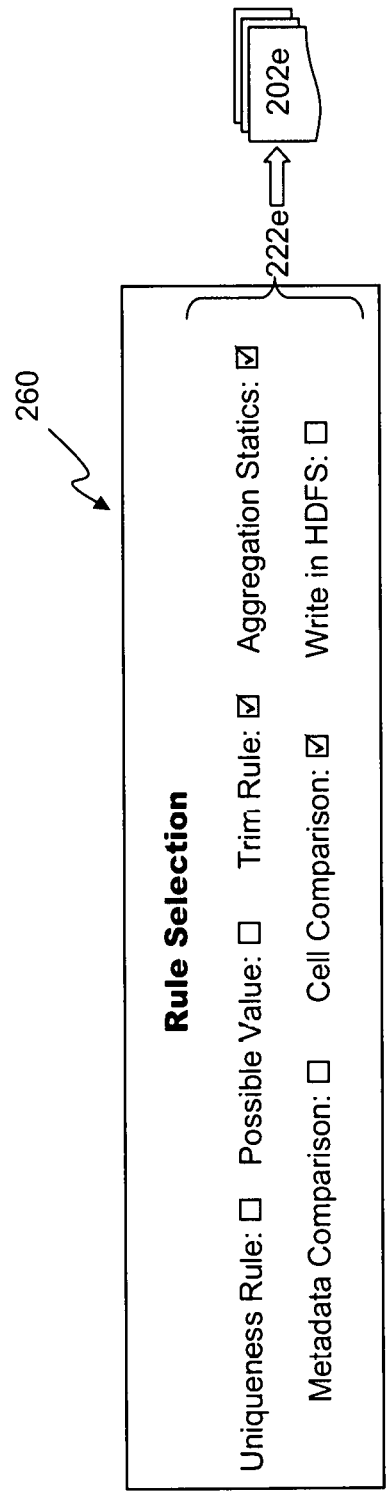
FIG. 3F is a screenshot depicting a user interface screen, according to an embodiment.

In embodiments, rule selection screen 260 can be presented, as depicted in the example of FIG. 3F. Rule selection screen 260 can present a variety of fields 222e for entry of validation parameters 202e. In embodiments, validation parameters 202e can enable the user to select which validation tasks will be performed. For example, in one embodiment, the user can selectively enable: data aggregation, row-by-row comparison (including whether uniqueness rule validation, and/or possible value rule validation are used), metadata comparison, and cell-by-cell comparison In embodiments, the user can also request data trimming, such that leading and trailing whitespace is ignored for comparison purposes. As depicted in FIGS. 3A-3F, input parameters 202 can be received by user interface 200 via on-screen inputs. In embodiments, other configuration techniques, or combinations thereof, can be used. For example, user interface 200 can receive and/or store a configuration file including some or all of input parameters 202 in embodiments. User interface 200 can also be provided with one or more default values for input parameters 202 in order to facilitate more efficient data entry. In embodiments, more, fewer, or alternate input parameters 202 or fields 222 can be provided.

Figure 4:
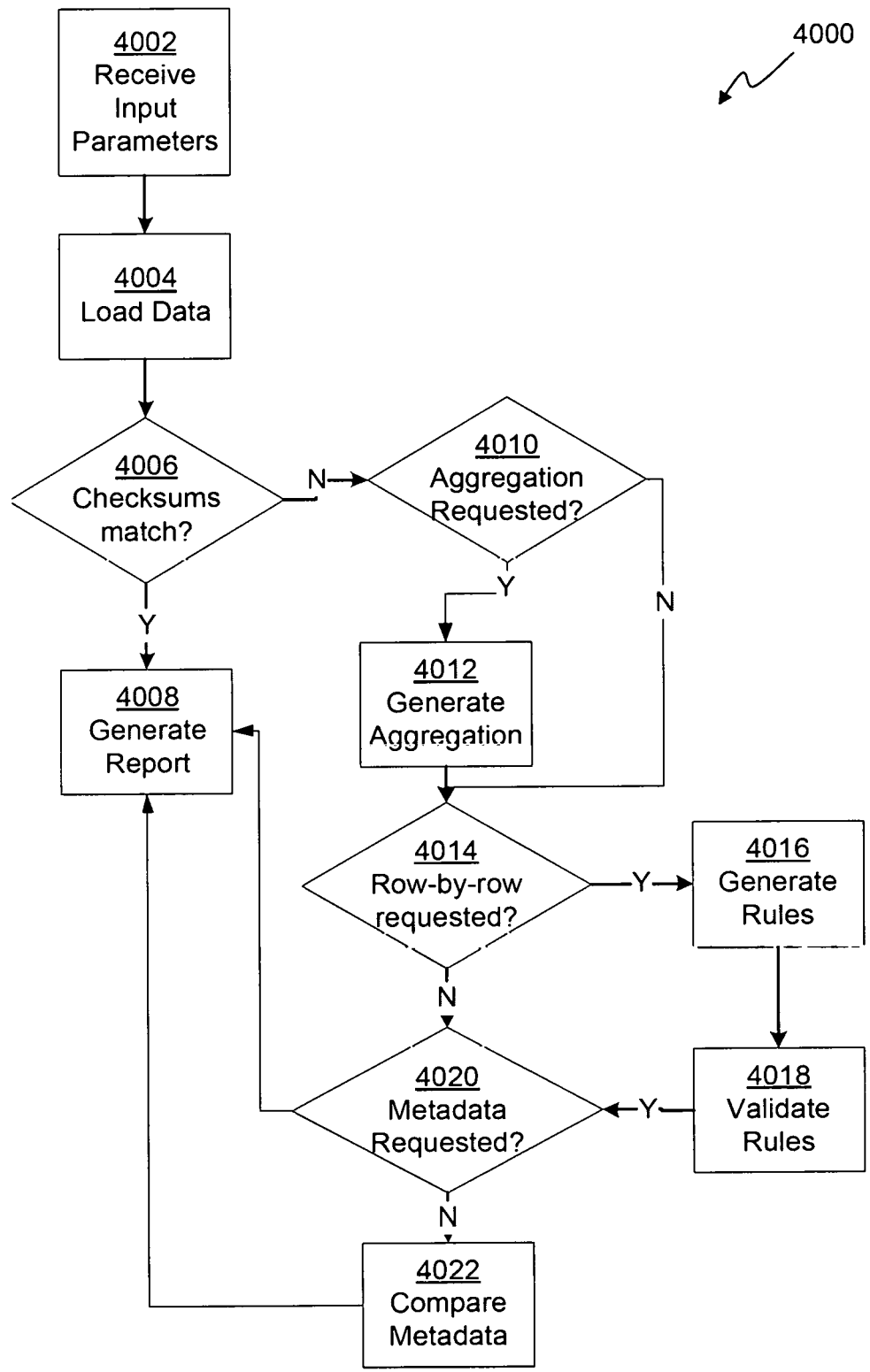
FIG. 4 is a flowchart depicting a method for data validation, according to an embodiment.

In embodiments, the various components and engines of system 100 can facilitate the execution of method 4000, depicted in FIG. 4. As discussed above, input parameters 202 can be received by user interface 200 at 4002.

At 4004, data load engine 302 can establish connections to data stores 104 and 108 to create copies of source data 102 and target data 106 within distributed memory 300. Data load engine 302 can receive input parameters 202 from user interface 200, or can use default values as needed. Data load engine can comprise JDBC connectors, Thoughtspot connectors, or other data connectors known in the art. Data load engine 302 can further produce column mapping 304.

Column mapping 304 can be produced based on column mapping input parameters 202c, other input parameters 202 and/or dynamic column identification. Dynamic column mapping can be based on column names, identified primary keys, column schema information retrievable from data stores 104 and 108, or other data and/or methods.

Checksum engine 400, aggregation engine 500, rule generation engine 600, validation engine 700, and metadata engine 800 can now perform processing on source data 102 and target data 106 in distributed memory 300 to produce comparison results and reports that can be provided to scheduler 900 and user interface 200. The various processing engines can be executed in a particular order, as described below, in order to minimize unnecessary processing steps. In alternate embodiments, the various processing engines can be executed in alternative orders, or executed in parallel.

At 4006, checksum engine 400 can calculate and compare checksum values 402 from source data 102 and target data 106. Checksums can be calculated quickly, and where they match, no further validation may be necessary. Processing can then end at 4008, with the generation of a report. In embodiments, checksum values 402 can be MD5 checksums, though other checksum, one-way hash, or other data validation algorithms and methods can be used.

Checksums can be calculated based on the type of data stores 104 and 108. If both source data store 104 and target data store 108 are files, checksum values 402 can be calculated based on the underlying file. If either source data store 104 or target data store 108 include database tables, checksum values 402 can be calculated for each column of source data 102 and target data 106 based on column mappings 304. In embodiments, columns with matching checksum values 402 can be excluded from further processing.

If checksum values 402 do not match, and data aggregation is enabled at 4010, an aggregation summary 502 can be generated by aggregation engine 500 at 4012. Aggregation engine 500 can review source data 102 and target data 106 for columns containing numerical data. In embodiments, aggregation engine 500 can query the column type from data stores 104 and 108, or column type information can be provided in column mappings 304. Aggregation engine 500 can also examine the data contained within each column of source data 102 and target data 106 to determine if the column contains solely numerical data.

Aggregation summary 502 can include a mean value, a sum, a minimum value, a maximum value, and a standard deviation value for the data elements in each numeric column. More, fewer, or alternate aggregation methods can be used, in embodiments. Aggregation summary 502 can enable a user to quickly determine columns that may be of interest. For example, if a data column was not replicated at all, the sum of the values in the column might be zero in the target data 106. In another example, if the average value of a column tracking daily sales is identical in source data 102 and target data 106, it can provide evidence to the user that the sales data was successfully replicated.

If row-by-row comparison is enabled at 4014, rule generation engine 600 can generate rules 602 for each of the enabled rule types at 4016. If not, control can proceed to metadata comparison at 4020. Possible-value rules 602*a* can be generated by reviewing each of the columns of source data 102 and determining, for each column, whether the column is likely limited to a known set of values. For example, a size column might contain only a limited set of sizes, such as S, M, and L. Rule generation engine 600 can therefore create a possible-value rule limiting the corresponding column in target data 106 to contain only S, M, and L. Possible-value rules 602*a* can comprise a list of columns with detected possible values, and the possible values for each.

Uniqueness rules 602*b* can be generated by reviewing each of the columns of source data 102 and determining, for each column, that no repeated values are present. This can indicate that the column contains randomly generated key values, identifiers, or other data that should be unique. Uniqueness rules 602*b* can comprise a list of columns that should be unique.

At 4018, validation engine 700 can check each row of target data 106 for compliance with generated rules 602 to produce validation report 702. Validation report 702 can comprise a list of columns and/or rows of target data 106 that do not comply with generated rules 602. For example, if a column is subject to a possible-value rule, and contains data that is not in the set of possible values, the row can be flagged. In addition, a column can be flagged if the column is subject to a possible-value rule and does not contain all of the possible values. For example, where a column contains the names of forty-three American states, the possible value set can include the forty-three names. A row in target data 106 can be flagged if it contains a state name that is not in the set, and the column in target data 106 can be flagged if any of the forty-three states are not present. Similarly, if a column is subject to a uniqueness rule, and contains duplicate data elements, the column (or rows containing the duplicate elements) can be flagged.

Rule-based validation as performed by validation engine 700 can enable the detection of anomalous data without the need to precisely match a row of the target data 106 with a corresponding row of the source data 102. This can facilitate fast and parallel execution of validation, because each processing node 112 can examine a smaller slice of target data 106, and may not need to access source data 102 at all. For example, possible-value rules 602*a* can be checked on an element-by-element basis. Each processing node 112 can therefore work with only individually cached data elements or rows. In addition, uniqueness rules 602*b* can be checked on a column-by-column basis, requiring each processing node 112 to work with only individually cached columns.

Rule-based validation can also allow more flexibility in validation of columns that are intended to have some controlled variation. For example, identifier or key columns can be independently generated in source data 102 and target data 106. Validation engine can ensure that the key columns are unique in both systems based on uniqueness rules 602*b*, and can provide further confidence in the validity of target data 106 by checking compliance with possible-value rules 602*a*.

If, at 4020, metadata comparison is requested, metadata engine 800 can generate a metadata report 802 at 4022. If not, processing can end with report generation at 4008. In embodiments, metadata engine 800 can query the column type from data stores 104 and 108, or column type information can be provided in column mappings 304. In addition, metadata engine 800 can infer the column type based on source data 102 and target data 106. For example, if a column contains only integer values, it can be given an integer metadata type. Metadata types can further be determined based on column names, where available. Metadata report 802 can comprise detected metadata information for each column of source data 102 and target data 106, and flag any mismatches.

Mismatches flagged by metadata engine 800 can indicate specific rows or columns that were not accurately replicated in target data store 108. For example, if a source column is determined to be a date column, non-date entries in target data store 108 can be indicative of data replication issues. In addition, if an entire target column is detected to be a different data type than the corresponding source column, this can provide evidence that a column mapping issue has occurred.

At 4008, a report 204 containing the available column mappings 304, checksum values 402, aggregation summary 502, rules 602, validation report 702, and/or metadata report 802 can be presented to the user via user interface 200. In embodiments, report 204 can comprise one or more files in a variety of formats known in the art, such as text, portable document format (PDF), hypertext markup language (HTML), extensible markup language (XML), word processor (DOCX), image (GIF, PNG, JPG, and the like), or other file formats. In embodiments, report 204 can comprise comma separated, or other field divided data that is readable by spreadsheet, or database tools. Report 204 can also be saved to a distributed file system such as HDFS, or other network file system as desired.

For the purposes of an example, FIG. 5A depicts tables representing sample source data 102 and target data 106 that can be processed by an embodiment of the present disclosure. As depicted, target data 106 contains a number of mismatches (indicated by a thicker border), relative to source data 102. FIG. 5B depicts a partial report, 204, that can be produced by an embodiment based on the input of FIG. 5A.

The depicted report 204 includes a checksum result 402', in this case indicated by a simple "No" value. In embodiments, however, checksum result 402' can include detailed checksum information, including the value(s) 402 of the calculated checksum(s) themselves.

The depicted aggregation summary 502 includes only minimum, maximum, mean, and count values for numerical fields of source data 102 and target data 106. In the depicted example, the calculated means of some columns display mismatches (indicated by a thicker border) due to mismatches in sample target data 106. This highlighting can take other forms, or be absent in embodiments.

The depicted report 204 includes the generated validation rules 602 as part of validation report 702. Here, five possible values were detected. The depicted validation report 702 further includes a listing of rows from target data 106 that violated the possible value rule. In embodiments, validation report 702 can further include lists of values that were expected, but not present in target data 106.

The generated metadata report 802 provides details of data types and semantics that were detected from the sample source data 102 and target data 106. As depicted, each field is organized based on the column mappings that were provided by the user, or automatically detected.

Each of the sections of the example report 204 depicted in FIG. 5B can include more, fewer, or alternate elements in embodiments. Reports 204 can include more, fewer, or alternate sections in embodiments. The report of FIG. 5B is also just one possible implementation of a report format, and other formats can be used as discussed above.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

What is claimed is:

1. A system for validating a target data table of a target data store based on a source data table of a source data store remote from the target data store, each of the target data table and the source data table including one or more rows and one or more columns for storing data elements, the system comprising:

a distributed memory comprising a plurality of computing systems, each computing system in data communication with at least one of the source data store or the target data store to receive at least a portion of the source data table and the target data table and configured to store the portion in a local random access memory such that the distributed memory includes the entirety of the source data table and the target data table;

a checksum comparison engine in data communication with the distributed memory and configured to respond to a checksum request by computing a checksum result indicating whether one or more source checksums computed based on the source data table match one or more target checksums computed based on the target data table;

a data aggregation engine in data communication with the distributed memory and configured to respond to a data aggregation request by computing a data aggregation summary for one or more columns of the source data store and one or more columns of the target data store;
a rule generation engine in data communication with the distributed memory and configured to respond to a rule generation request by computing one or more validation rules based on the source data table;
a validation engine in data communication with the distributed memory and configured to respond to a validation request by evaluating each row of the target data table based on the one or more validation rules without matching a row of the target data table to a corresponding row of the source data table to produce a validation report; and
a user interface configured to generate an output based on the checksum result, the aggregation summary, and the validation report.

2. The system of claim 1, wherein at least one of the checksum comparison engine, the data aggregation engine, or the validation engine comprises a parallel instruction set, executable on each of the plurality of computing systems of the distributed memory, such that each of the plurality of computing systems executes the parallel instruction set on the portion of the source data table and the target data table stored in the local random access memory of the computing system, and wherein the parallel instruction set is executed in-memory.

3. The system of claim 1, wherein the one or more source checksums and the one or more target checksums comprise Message Digest 5 (MD5) checksums.

4. The system of claim 1, further comprising a scheduler in data communication with the checksum comparison engine, the data aggregation engine, the validation engine, and the user interface, and configured to:
deliver the checksum request to the checksum comparison engine and provide the checksum result to the user interface,
deliver the data aggregation request to the data aggregation engine and the rule generation request to the rule generation engine and provide the data aggregation summary to the user interface if the checksum result indicates that the one or more source checksums does not match the one or more target checksums,
deliver the validation request to the validation engine including the generated validation rules to the validation engine, and
provide the validation report to the user interface.

5. The system of claim 1, wherein the data aggregation engine is configured to determine whether a column of the source data table is numeric based on the data elements of the source data table and whether a column of the target data table is numeric based on the data elements of the target data table.

6. The system of claim 5, wherein the data aggregation engine is configured to compute a separate aggregation summary for each numeric column of the source data table and the target data table.

7. The system of claim 6, wherein the aggregation summary for each numeric column of the source data table and the target data table comprises a mean value, a sum, a minimum value, a maximum value, and a standard deviation value for the data elements in the numeric column.

8. The system of claim 1, wherein the rule generation engine is configured to compute a possible value validation rule for a column of the source data table if the column contains a limited set of values, such that the validation engine will determine that a data element of the target data table violates the possible value validation rule if the data element is in the column and has a value that is not represented in the limited set of values.

9. The system of claim 1, wherein the rule generation engine is configured to compute a uniqueness rule for a column of the source data table if the column contains unique values for each row of the source table, whereby the validation engine will determine that a column of the target data table violates the uniqueness rule if the column does not contain unique values.

10. The system of claim 1, further comprising a metadata evaluation engine configured to respond to a metadata evaluation request by computing a column type for each column of the source data table and the target data table.

11. A method for validating a target data table of a target data store based on a source data table of a source data store remote from the target data store, each of the target data table and the source data table including one or more rows and one or more columns for storing data elements, the method comprising:
loading the source data table and the target data table into a distributed memory comprising a plurality of computing systems, each computing system in data communication with at least one of the source data store or the target data store to receive at least a portion of the source data table and the target data table and configured to store the portion in a local random access memory such that the distributed memory includes the entirety of the source data table and the target data table;
computing a checksum result indicating whether one or more source checksums computed based on the source data table match one or more target checksums based on the target data table;
computing a data aggregation summary for one or more columns of the source data store and one or more columns of the target data store if the checksum result indicates that the source checksums do not match the target checksums;
computing a validation report if the checksum result indicates that the source checksums do not match the target checksums by:
computing one or more validation rules based on the source data table, and
evaluating each row of the target data table based on the one or more validation rules without matching a row of the target data table to a corresponding row of the source data table; and
generating an output based on the checksum result, the aggregation summary, and the validation report.

12. The method of claim 11, further comprising computing at least one of the checksum result, the data aggregation summary, or the validation report by executing a parallel instruction set on each of the plurality of computing systems of the distributed memory, such that each of the plurality of computing systems executes the parallel instruction set on the portion of the source data table and the target data table stored in the local random access memory of the computing system; whereby the parallel instruction set is executed in-memory.

13. The method of claim 11, wherein the one or more source checksums and the one or more target checksums comprise Message Digest 5 (MD5) checksums.

14. The method of claim 11, further comprising determining whether a column of the source data table is numeric based on the data elements of the source data table and whether a column of the target data table is numeric based on the data elements of the target data table.

15. The method of claim 14, wherein a separate data aggregation summary is computed for each numeric column of the source data table and the target data table.

16. The method of claim 15, wherein the aggregation summary for each numeric column of the source data table and the target data table comprises a mean value, a sum, a minimum value, a maximum value, and a standard deviation value for the data elements in the numeric column.

17. The method of claim 11, wherein computing one or more validation rules based on the source data table comprises:
   computing a possible value validation rule for a column of the source data table if the column contains a limited set of values, such that a data element of the target data table is evaluated to violate the possible value validation rule if the data element is in the column and has a value that is not represented in the limited set of values.

18. The method of claim 11, wherein computing one or more validation rules based on the source data table comprises:
   computing a uniqueness rule for a column of the source data table if the column contains a unique value for each row of the source table, such that a column of the target data table is evaluated to violate the uniqueness rule if the column does not contain unique values.

19. The method of claim 11, further comprising responding to a metadata evaluation request by computing a column type for each column of the source data table and the target data table.

* * * * *